(12) United States Patent
Xiong et al.

(10) Patent No.: US 9,378,085 B2
(45) Date of Patent: Jun. 28, 2016

(54) METHOD FOR ESTIMATING BLOCK ERROR RATE AND COMMUNICATION DEVICE

(71) Applicant: HUAWEI TECHNOLOGIES CO., LTD., Shenzhen (CN)

(72) Inventors: Jie Xiong, Shanghai (CN); Yuejun Wei, Moscow (RU); Ying Jin, Shanghai (CN); Qian Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 14/104,578

(22) Filed: Dec. 12, 2013

(65) Prior Publication Data

US 2014/0101498 A1    Apr. 10, 2014

Related U.S. Application Data

(63) Continuation of application No. PCT/CN2011/075804, filed on Jun. 16, 2011.

(51) Int. Cl.
*G06F 11/00* (2006.01)
*G06F 11/10* (2006.01)
*H04L 1/20* (2006.01)
*H04L 1/00* (2006.01)

(52) U.S. Cl.
CPC .............. *G06F 11/10* (2013.01); *H04L 1/203* (2013.01); *H04L 1/0054* (2013.01)

(58) Field of Classification Search
CPC ........ G06F 11/10; H04L 1/203; H04L 1/0054
See application file for complete search history.

(56) References Cited

U.S. PATENT DOCUMENTS

| 2005/0180344 A1 | 8/2005 | Sternberg et al. | 370/310 |
| 2007/0162788 A1 | 7/2007 | Moelker | 714/704 |
| 2009/0031190 A1 | 1/2009 | Oosuge | 714/758 |

(Continued)

FOREIGN PATENT DOCUMENTS

| CN | 1338824 A | 3/2002 |
| CN | 101106380 A | 1/2008 |

(Continued)

OTHER PUBLICATIONS

Japanese Office Action dated Jan. 13, 2015 in corresponding Japanese Patent Application No. 2014-515025.

(Continued)

*Primary Examiner* — Sam Rizk
(74) *Attorney, Agent, or Firm* — Staas & Halsey LLP

(57) ABSTRACT

A method for estimating a block error rate and a communication device are applied to the field of communications technologies. The method for estimating a block error rate includes: decoding N received coded code blocks to obtain multiple posterior probabilities APPs, where N is a natural number greater than 1; obtaining, according to the multiple posterior probabilities APPs and a preset policy, a result indicating that the decoding of each coded code block is correct or incorrect, where the preset policy includes: when a sum of absolute values of the multiple APPs is greater than or equal to a preset threshold, the decoding is correct; and obtaining a decoding block error rate according to a result indicating whether the decoding of the N coded code blocks is correct. In this way, the estimation of a decoding block error rate is implemented.

6 Claims, 3 Drawing Sheets

(56) References Cited

U.S. PATENT DOCUMENTS

| | | | |
|---|---|---|---|
| 2009/0132893 A1 | 5/2009 | Miyazaki et al. | |
| 2010/0064185 A1* | 3/2010 | Zheng et al. | 714/704 |
| 2011/0044379 A1 | 2/2011 | Lilleberg et al. | |
| 2011/0261868 A1* | 10/2011 | Bachl et al. | 375/224 |
| 2012/0185755 A1 | 7/2012 | Orlik et al. | |

FOREIGN PATENT DOCUMENTS

| | | |
|---|---|---|
| CN | 101217336 A | 7/2008 |
| CN | 101248596 A | 8/2008 |
| JP | 2004-282284 | 10/2004 |
| JP | 2006-100996 | 4/2006 |
| JP | 2007-522765 | 8/2007 |
| JP | 2012-151839 | 8/2012 |
| JP | 2014-15497 | 1/2014 |
| WO | 2008/015742 A1 | 2/2008 |
| WO | 2010/049988 A1 | 5/2010 |

OTHER PUBLICATIONS

IEEE Std 802.16™-2004 (Revision of IEEE Std 802.16/2001). "Part 16: Air Interface for Fixed Broadband Wireless Access Systems." In *802.16™ IEEE Standard for Local and metropolitan area networks*. New York, New York: The Institute of Electrical and Electronics Engineers, Inc. Oct. 1, 2004. pp. 0-857.

IEEE Std 802.16e™-2005 and IEEE Std 802.16™-2004/Cor1-2005 (Amendment and Corrigendum to IEEE Std 802.16/2004). "Part 16: Air Interface for Fixed and Mobile Broadband Wireless Access Systems; Amendment 2: Physical and Medium Access Control Layers for Combined Fixed and Mobile Operation in Licensed Bands and Corrigendum 1." In *IEEE Standard for Local and metropolitan area networks*. New York, New York: The Institute of Electrical and Electronics Engineers, Inc. Feb. 28, 2006. pp. 0-822.

3GPP TS 36.212 V8.7.0 (May 2009). *$3^{rd}$ Generation Partnership Project; Technical Specification Group Radio Access Network; Evolved Universal Terrestrial Radio Access (E-UTRA); Multiplexing and channel coding (Release 8)*. Technical Specification. Vabonne, France: $3^{rd}$ Generation Partnership Project. 2009. pp. 1-60.

IEEE P802.16m/D12. "Part 16: Air Interface for Broadband Wireless Access Systems: Advanced Air Interface." In *DRAFT Amendment to IEEE Standard for Local and metropolitan area networks*. New York, New York: The Institute of Electrical and Electronics Engineers, Inc. Feb. 17, 2011. pp. 0-1,086.

International Search Report issued Mar. 29, 2012, in corresponding International Patent Application No. PCT/CN2011/075804.

International Search Report mailed Mar. 29, 2012 in corresponding International Application No. PCT/CN2011/075804.

Extended European Search Report issued Mar. 31, 2014, in corresponding European Patent Application No. 11867811.9.

Japanese Notice of Allowance dated May 12, 2015 in corresponding Japanese Patent Application No. 2014-515025.

\* cited by examiner

METHOD FOR ESTIMATING BLOCK ERROR RATE AND COMMUNICATION DEVICE

CROSS-REFERENCE TO RELATED APPLICATIONS

This application is a continuation of International Application No. PCT/CN2011/075804, filed on 16 Jun. 2011, which is hereby incorporated by reference in its entirety.

TECHNICAL FIELD

The present invention relates to the field of communications technologies, and in particular, to a method for estimating a block error rate and a communication device.

BACKGROUND

In an existing communication system, generally a Turbo code is used to code data service information whose code length is relatively large. As an error-correcting code, the Turbo code is often used with a cyclic redundancy check (Cyclic Redundancy Check, CRC) error-detecting code to perform cascaded coding. A receive end may learn, according to a CRC checking result, whether decoding with the error-correcting code is correct.

Specifically, at a transmit end, a media access control (Media Access Control, MAC) layer issues a transport block (Transport Block, TB) to a physical layer (PHY). Generally, the TB is relatively large and this does not facilitate coding at the physical layer. As shown in FIG. 1a and FIG. 1b, the physical layer first performs CRC coding for the TB to form transport block cyclic redundancy check (Transport Block Cyclic Redundancy Check, TB-CRC), appends the TB-CRC (the parts padded by crossing lines shown in FIG. 1a and FIG. 1b) to a data tail of the TB, splits the TB into multiple code blocks (CB, Code Block), and performs separate Turbo coding for each CB.

At the receive end, a physical layer decodes received data, checks the TB-CRC, and learns whether the decoding of the TB is correct according to a checking result; and a radio resource management (Radio Resource Management, RRM) layer needs to learn a packet error ratio (packet Error Ratio, PER) or a short-time (such as tens of milliseconds) block error rate (Block Error Ratio, BLER) of the decoding performed by the physical layer, so as to estimate short-time channel quality, adjust a power control policy, or do the like.

In the prior art, there are the following two methods for the physical layer at the transmit end to process the CBs split from the TB: As shown in FIG. 1a, the physical layer may directly perform Turbo coding for the CBs after the splitting; or as shown in FIG. 1b, the physical layer may perform CRC coding for each CB after the splitting to form code block cyclic redundancy check (CB-CRC), appends the obtained CB-CRC (the parts padded by dots shown in FIG. 1b) to a data tail of each CB, and performs Turbo coding for each CB.

If the transmit end directly codes the CBs, the receive end can learn whether the decoding of the received data is correct only according to the TB-CRC check, and therefore the RRM layer can learn only a BLER of the transport block. However, in some applications, for example, the BLER needs to be output once every tens of milliseconds during power control but there are about tens of transport blocks within a duration as short as tens of milliseconds, and therefore, a small number of sampling points are available for estimating the BLER at the receive end, and the estimation is not precise.

SUMMARY

Embodiments of the present invention provide a method for estimating a block error rate and a communication device, so as to improve the precision of estimating a block error rate at a receive end.

According to one aspect, the present invention provides a method for estimating a block error rate, including:

decoding N received coded code blocks respectively to obtain multiple posterior probabilities APPs, where N is a natural number greater than 1;

obtaining, according to the multiple posterior probabilities APPs and a preset policy, a result indicating that the decoding of each coded code block is correct or incorrect, where the preset policy includes: when a sum of absolute values of the multiple APPs is greater than or equal to a preset threshold, the decoding is correct; and obtaining a decoding block error rate according to a result indicating whether the decoding of the N coded code blocks is correct.

According to one aspect, the present invention provides another method for estimating a block error rate, including:

decoding multiple log-likelihood ratios LLRs that correspond to each coded code block among N received coded code blocks to obtain multiple posterior probabilities APPs, where N is a natural number greater than 1;

obtaining, according to the multiple posterior probabilities APPs, the multiple log-likelihood ratios LLRs, and a preset policy, a result indicating that the decoding of each coded code block is correct or incorrect, where the preset policy includes: when a ratio of a sum of absolute values of the multiple APPs to a sum of absolute values of the multiple LLRs is greater than or equal to a preset threshold, the decoding is correct; and obtaining a decoding block error rate according to results indicating whether the decoding of the N coded code blocks are correct or incorrect.

According to another aspect, the present invention provides a communication device including:

a first decoding unit, configured to decode N received coded code blocks respectively to obtain multiple posterior probabilities APPs, where N is a natural number greater than 1;

a first decoding result obtaining unit, configured to obtain, according to the multiple posterior probabilities APPs obtained by the first decoding unit and a preset policy, a result indicating that the decoding of each coded code block is correct or incorrect, where the preset policy includes: when a sum of absolute values of the multiple APPs is greater than or equal to a preset threshold, the decoding is correct; and a first block error rate obtaining unit, configured to obtain a decoding block error rate according to results indicating whether the decoding of the N coded code blocks are correct or incorrect.

According to another aspect, the present invention provides another communication device, including:

a second decoding unit, configured to decode multiple log-likelihood ratios LLRs that correspond to each coded code block among N received coded code blocks to obtain multiple posterior probabilities APPs, where N is a natural number greater than 1;

a second decoding result obtaining unit, configured to obtain, according to the multiple posterior probabilities APPs of the second decoding unit, the multiple log-likelihood ratios LLRs, and a preset policy, a result indicating that the decoding of each coded code block is correct or incorrect, where the preset policy includes: when a ratio of a sum of absolute values of the multiple APPs to a sum of absolute values of the multiple LLRs is greater than or equal to a preset threshold, the decoding is correct; and a second block error rate obtaining unit, configured to obtain a decoding block error rate according to results indicating whether the decoding of the N coded code blocks are correct or incorrect.

In the embodiments of the present invention, after receiving coded code blocks, a receive end decodes N of the coded code blocks to obtain multiple APPs; obtains, according to the multiple APPs and a preset policy, a result indicating whether the decoding of each coded code block is correct, where the preset policy includes: when a sum of absolute values of the multiple APPs is greater than or equal to a preset threshold, the decoding is correct; and obtains a decoding block error rate according to results indicating whether the decoding of the N coded code blocks ares correct or incorrect. In this way, when a sending end codes the CBs directly according to a method shown in FIG. 1a, an RRM layer at the receive end can estimate a block error rate BLER according to relevant parameters of the coded CBs, so that there are a relatively large number of code blocks in a duration as short as tens of milliseconds, and therefore, quite many sampling points are available for estimating the BLER at the receive end and the estimation is more precise.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
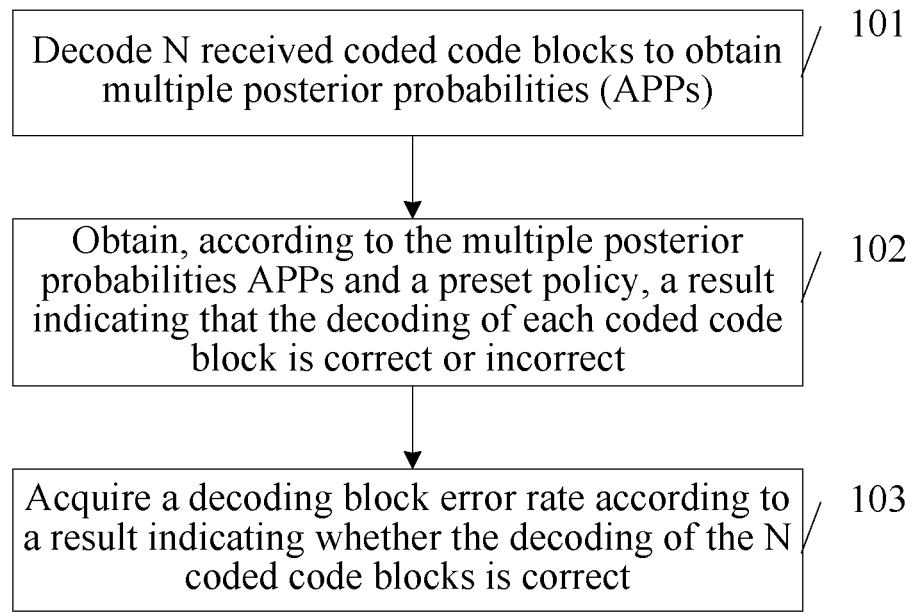
FIG. 2 is a flowchart of a method for estimating a block error rate according to an embodiment of the present invention.

An embodiment of the present invention provides a method for estimating a block error rate. The method provided in this embodiment is a method executed by a communications receive end, a flowchart of which is shown in FIG. 2. The method includes the following steps:

Step 101: Decode N received coded code blocks to obtain multiple posterior probabilities (A Posteriori Probability, APP), where N is a natural number greater than 1.

Figure 1A:
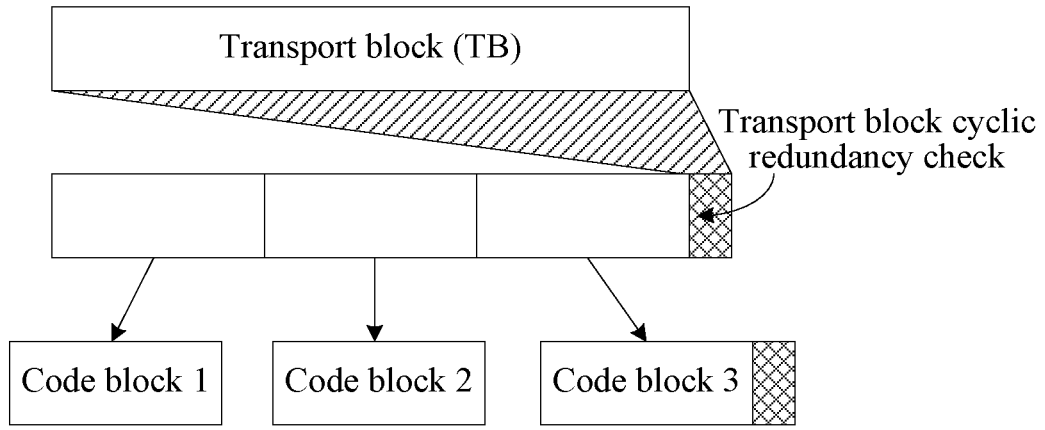
FIG. 1a is a schematic diagram of a structure for processing a code block in the prior art.
Figure 1B:
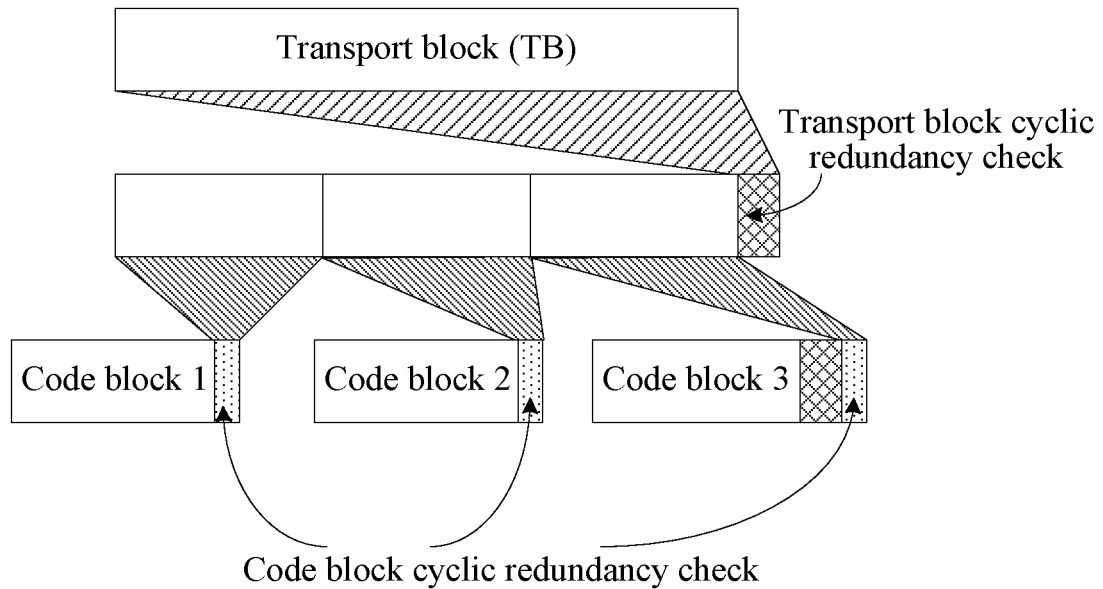
FIG. 1b is a schematic diagram of another structure for processing a code block in the prior art.

It may be understood that during coding of CBs split from a TB, a physical layer at a transmit end may directly perform Turbo coding for the CBs, as shown in FIG. 1a, to obtain coded code blocks, and send the coded code blocks to the receive end; or may first perform CRC coding for each CB to form CB-CRC, as shown in FIG. 1b, append the obtained CB-CRC to a data tail of each corresponding CB, perform Turbo coding for each CB to obtain coded code blocks, and send the coded code blocks to the receive end.

In this way, after receiving the coded CBs, a physical layer at the receive end may select N coded CBs, for example, select N coded CBs received within a short duration (such as tens of milliseconds) or select N coded CBs received within a long duration (such as hundreds of milliseconds). When decoding each coded CB, the physical layer at the receive end first performs demodulation to obtain multiple log-likelihood ratios (Log-Likelihood Ratio, LLR) that correspond to the coded CB, and performs Turbo coding for the multiple LLRs to obtain multiple APPs.

Step 102: Obtain, according to the multiple posterior probabilities APPs and a preset policy, a result indicating that the decoding of each coded code block is correct or incorrect, where the preset policy includes: when a sum of absolute values of the multiple APPs is greater than or equal to a preset threshold, the decoding is correct; or if a sum of absolute values of the multiple APPs is smaller than a preset threshold, the decoding is incorrect.

Here, the preset threshold is prestored at the receive end, and may vary according to different actual communication channels.

The receive end needs to obtain, through the preset policy, a result indicating whether the decoding of each coded CB among the N coded CBs is correct. Specifically, assuming that M APPs are obtained after LLRs of a coded CB are decoded, the receive end first adds up absolute values of the M APPs to an add-up value, and compares the add-up value with the preset threshold. If the add-up value is greater than or equal to the preset threshold, the decoding performed by the receive end for the coded CB is correct; if the add-up value is smaller than the preset threshold, the decoding performed by the receive end for the coded CB is incorrect.

Step 103: Obtain a decoding block error rate according to a result indicating whether the decoding of the N coded code blocks is correct.

When obtaining the decoding block error rate, an RRM layer at the receive end may compare the number of incorrectly decoded coded code blocks obtained in step 102 with N to obtain the decoding block error rate. Assuming that P coded CBs are incorrectly decoded in the process of decoding the N coded CBs at the receive end, the decoding block error rate is P/N×100%.

As can be seen, in this embodiment of the present invention, after receiving coded code blocks, a receive end decodes N of the coded code blocks to obtain multiple APPs; obtains, according to the multiple APPs and a preset policy, a result indicating whether the decoding of each coded code block is correct, where the preset policy includes: when a sum of absolute values of the multiple APPs is greater than or equal to a preset threshold, the decoding is correct; and obtains a decoding block error rate according to a result indicating whether the decoding of the N coded code blocks is correct. In this way, when a sending end codes the CBs directly according to a method shown in FIG. 1a, an RRM layer at the receive end can estimate a block error rate BLER according to relevant parameters of the coded CBs, so that there are a relatively large number of code blocks in a duration as short as tens of milliseconds, and therefore, quite many sampling points are available for estimating the BLER at the receive end and the estimation is more precise.

Figure 3:
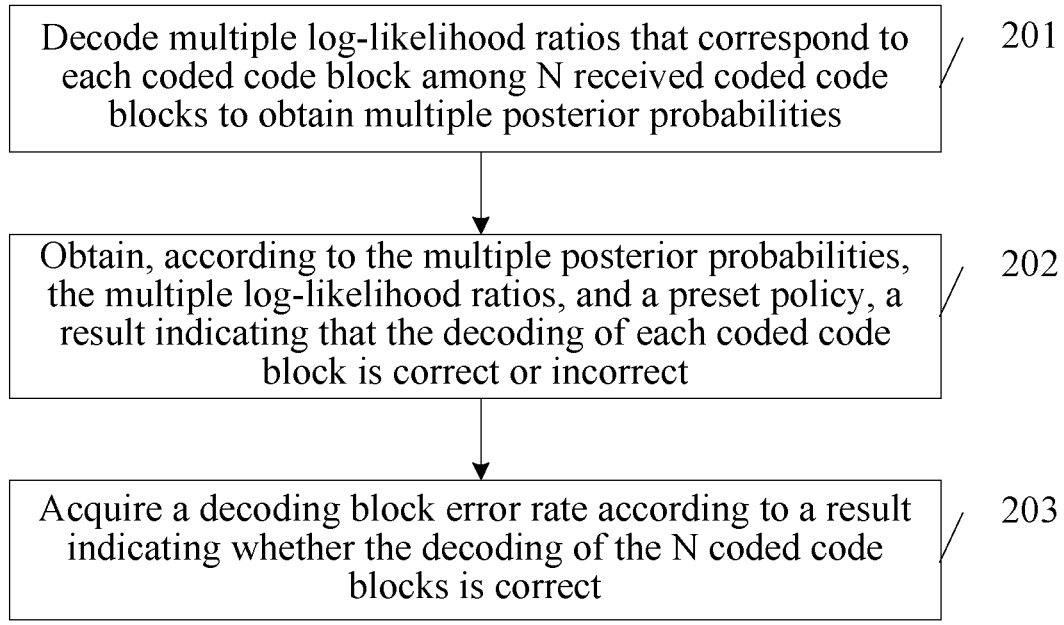
FIG. 3 is a flowchart of another method for estimating a block error rate according to an embodiment of the present invention.

An embodiment of the present invention further provides another method for estimating a block error rate. The method provided in this embodiment is a method executed by a communications receive end, a flowchart of which is shown in FIG. 3. The method includes the following steps:

Step 201: Decode multiple log-likelihood ratios LLRs that correspond to each coded code block among N received coded code blocks to obtain multiple posterior probabilities APPs, where N is a natural number greater than 1.

It may be understood that during coding of CBs split from a TB, a physical layer at a transmit end may directly perform Turbo coding for the CBs to obtain coded code blocks, and send the coded code blocks to the receive end; or may first perform CRC coding for each CB to form CB-CRC, append the obtained CB-CRC to a data tail of each corresponding CB, perform Turbo coding for each CB to obtain coded code blocks, and send the coded code blocks to the receive end.

In this way, after receiving the coded CBs, a physical layer at the receive end may select N coded CBs, for example, select N coded CBs received within a short duration (such as tens of milliseconds) or select N coded CBs received within a long duration (such as hundreds of milliseconds). When decoding each coded CB, the physical layer at the receive end first performs demodulation to obtain multiple LLRs that correspond to the coded CB, and performs Turbo coding for the multiple LLRs to obtain multiple APPs.

Step 202: Obtain, according to the multiple posterior probabilities APPs, the multiple log-likelihood ratios LLRs, and a preset policy, a result indicating that the decoding of each coded code block is correct or incorrect, where the preset policy includes: when a ratio of a sum of absolute values of the multiple APPs to a sum of absolute values of the multiple LLRs is greater than or equal to a preset threshold, the decoding is correct; or if a ratio of a sum of absolute values of the multiple APPs to a sum of absolute values of the multiple LLRs is smaller than a preset threshold, the decoding is incorrect.

Here, the preset threshold is prestored at the receive end, and may vary according to different actual communication channels.

The receive end needs to obtain, through the preset policy, a result indicating whether the decoding of each coded CB among the N coded CBs is correct. Specifically, assuming that H APPs are obtained after H LLRs of a coded CB are decoded, the receive end first obtains a ratio of a sum of absolute values of the H APPs to a sum of absolute values of the H LLRs, and compares the ratio with the preset threshold. If the ratio is greater than or equal to the preset threshold, the decoding performed by the receive end for the coded CB is correct; if the ratio is smaller than the preset threshold, the decoding performed by the receive end for the coded CB is incorrect.

Step 203: Obtain a decoding block error rate according to a result indicating whether the decoding of the N coded code blocks is correct.

When obtaining the decoding block error rate, an RRM layer at the receive end may compare the number of incorrectly decoded coded code blocks obtained in step 202 with N to obtain the decoding block error rate. Assuming that P coded CBs are incorrectly decoded in the process of decoding the N coded CBs at the receive end, the decoding block error rate is P/N×100%.

As can be seen, in this embodiment of the present invention, after receiving coded code blocks, a receive end decodes multiple LLRs of each coded code block among N of the coded code blocks to obtain multiple APPs; obtains, according to the multiple APPs, the multiple LLRs, and a preset policy, a result indicating whether the decoding of each coded code block is correct, where the preset policy includes: when a ratio of a sum of absolute values of the multiple APPs to a sum of absolute values of the multiple LLRs is greater than or equal to a preset threshold, the decoding is correct; and obtains a decoding block error rate according to a result indicating whether the decoding of the N coded code blocks is correct. In this way, when a sending end codes the CBs directly according to a method shown in FIG. 1a, an RRM layer at the receive end can estimate a block error rate BLER according to relevant parameters of the coded CBs, so that there are a relatively large number of code blocks in a duration as short as tens of milliseconds, and therefore, quite many sampling points are available for estimating the BLER at the receive end and the estimation is more precise.

In a specific embodiment, if the sending end first performs CRC coding for the CBs according to a method shown in FIG. 1b to form CB-CRC, append the CB-CRC to data tails of the CBs, and then perform coding for the CBs, the receive end may also estimate the block error rate by using the method provided in this embodiment of the present invention while the precision of the estimated block error rate can be ensured.

Assuming that the block error rate estimated by using the method provided in this embodiment of the present invention is recorded as Quot_Instant_BLER whereas the block error rate estimated by using the CB-CRC in the prior art is recorded as CRC_Instant_BLER, a standard deviation σ between them is:

$$\sigma \sqrt{\sum_{i=1}^{N} (CRC\_Instant\_BLER[i] - Quot\_Instant\_BLER[i])^2}$$

Here, N is the number of CBs. If a length of a CB is K=5114, a code rate (CR) is 0.6, and the preset threshold is 7.6, the standard deviation σ of short-time block error rates estimated on an additive white Gaussian noise (Additive White Gaussian Noise, AWGN) channel and on a typical urban (Typical Urban, TU) 30 fading channel is shown in Table 1.

TABLE 1

| On an AWGN Channel | | On a TU30 Channel | |
| --- | --- | --- | --- |
| Signal-to-noise ratio (SNR) | σ | SNR | σ |
| 5 dB | $1.45 \times 10-2$ | 4 dB | $1.32 \times 10-2$ |
| 6 dB | $1.32 \times 10-2$ | 5 dB | $1.36 \times 10-2$ |
| 7 dB | $1.17 \times 10-2$ | 6 dB | $1.16 \times 10-2$ |
| 8 dB | $9.44 \times 10-3$ | 7 dB | $1.01 \times 10-2$ |
| 9 dB | $7.81 \times 10-3$ | 8 dB | $7.93 \times 10-3$ |
| 10 dB | $5.96 \times 10-3$ | 9 dB | $4.83 \times 10-3$ |
| 11 dB | $4.53 \times 10-3$ | 9.5 dB | $4.01 \times 10-3$ |
| Total | $1.019 \times 10-2$ | Total | $8.258 \times 10-3$ |

As can be seen from Table 1, because the standard deviation σ is very small, a difference between the block error rate estimated by using the method provided in this embodiment of the present invention and the block error rate estimated by using the CB-CRC is very small. Therefore, the accuracy of the block error rate estimated by using the method provided in this embodiment of the present invention is very high.

Figure 4:
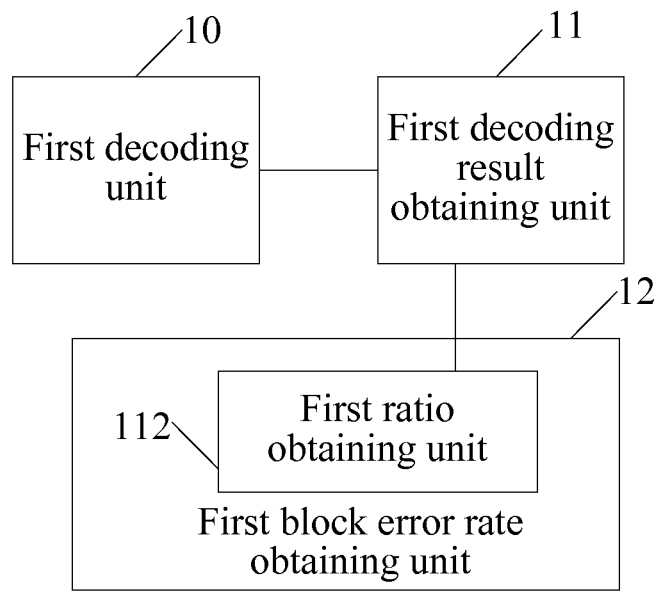
FIG. 4 is a schematic structural diagram of a communication device according to an embodiment of the present invention.

FIG. 4 is a schematic structural diagram of a communication device according to an embodiment of the present invention, including:

a first decoding unit 10, configured to decode N received coded code blocks to obtain multiple posterior probabilities APPs, where N is a natural number greater than 1;

a first decoding result obtaining unit 11, configured to obtain, according to the multiple posterior probabilities APPs obtained by the first decoding unit 10 and a preset policy, a result indicating that the decoding of each coded code block is correct or incorrect, where the preset policy includes: when a sum of absolute values of the multiple APPs is greater than or equal to a preset threshold, the decoding is correct; and a first block error rate obtaining unit 12, configured to obtain a decoding block error rate according to a result indicating whether the decoding of the N coded code blocks obtained by the first decoding result obtaining unit 11 is correct.

In a specific embodiment, the first block error obtaining unit 12 may obtain the decoding block error rate through a first ratio obtaining unit 112, where the first ratio obtaining unit 112 is configured to obtain the decoding block error rate by comparing the number of incorrectly decoded coded code blocks with the N.

In the communication device according to this embodiment of the present invention, after the communication device receives coded code blocks, a first decoding unit 10 decodes N of the coded code blocks to obtain multiple APPs; a first decoding result obtaining unit 11 obtains, according to the multiple APPs and a preset policy, a result indicating whether the decoding of each coded code block is correct, where the preset policy includes: when a sum of absolute values of the multiple APPs is greater than or equal to a preset threshold, the decoding is correct; and a first block error rate obtaining unit 12 obtains a decoding block error rate according to a result indicating whether the decoding of the N coded code blocks is correct. In this way, when a sending end codes the CBs directly according to a method shown in FIG. 1a, an RRM layer at the receive end can estimate a block error rate BLER according to relevant parameters of the coded CBs, so that there are a relatively large number of code blocks in a duration as short as tens of milliseconds, and therefore, quite many sampling points are available for estimating the BLER at the receive end and the estimation is more precise.

Figure 5:
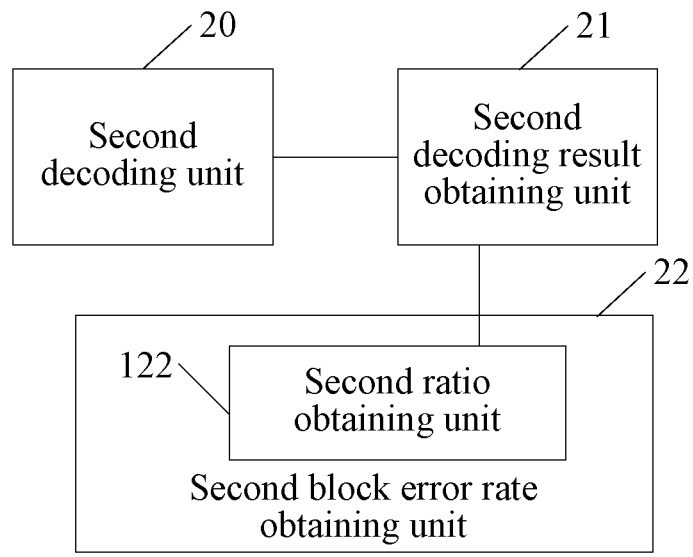
FIG. 5 is a schematic structural diagram of another communication device according to an embodiment of the present invention.

An embodiment of the present invention provides another communication device, a schematic structural diagram of which is shown in FIG. 5. The communication device includes:

a second decoding unit 20, configured to decode multiple log-likelihood ratios LLRs that correspond to each coded code block among N received coded code blocks to obtain multiple posterior probabilities APPs, where N is a natural number greater than 1;

a second decoding result obtaining unit 21, configured to obtain, according to the multiple posterior probabilities APPs of the second decoding unit 20, the multiple log-likelihood ratios LLRs, and a preset policy, a result indicating that the decoding of each coded code block is correct or incorrect, where the preset policy includes: when a ratio of a sum of absolute values of the multiple APPs to a sum of absolute values of the multiple LLRs is greater than or equal to a preset threshold, the decoding is correct; and a second block error rate obtaining unit 22, configured to obtain a decoding block error rate according to a result indicating whether the decoding of the N coded code blocks obtained by the second decoding result obtaining unit 21 is correct.

In a specific embodiment, the second block error obtaining unit 22 may obtain the decoding block error rate through a second ratio obtaining unit 122, where the second ratio obtaining unit 122 is configured to obtain the decoding block error rate by comparing the number of incorrectly decoded coded code blocks with the N.

In the communication device according to this embodiment of the present invention, after the communication device receives coded code blocks, a second decoding unit 20 decodes multiple LLRs of each coded code block among N of the coded code blocks to obtain multiple APPs; a second decoding result obtaining unit 21 obtains, according to the multiple APPs, the multiple LLRs, and a preset policy, a result indicating whether the decoding of each coded code block is correct, where the preset policy includes: when a ratio of a sum of absolute values of the multiple APPs to a sum of absolute values of the multiple LLRs is greater than or equal to a preset threshold, the decoding is correct; and a second block error rate obtaining unit 22 obtains a decoding block error rate according to a result indicating whether the decoding of the N coded code blocks is correct. In this way, when a sending end codes the CBs directly according to a method shown in FIG. 1a, an RRM layer at the receive end can estimate a block error rate BLER according to relevant parameters of the coded CBs, so that there are a relatively large number of code blocks in a duration as short as tens of milliseconds, and therefore, quite many sampling points are available for estimating the BLER at the receive end and the estimation is more precise.

For the first and second decoding units, the first and second decoding result obtaining units, the first and second block error rate obtaining units, and the first and second ratio obtaining units, "first" and "second" do not represent a sequence but are only intended to distinguish different units.

A person of ordinary skill in the art may understand that all or a part of the steps of the methods in the foregoing embodiments may be implemented by a computer program instructing relevant hardware. The program may be stored in a computer readable storage medium. The storage medium may include a ROM, a RAM, a magnetic disk, or an optical disk.

The foregoing detailed descriptions are about a method for estimating a block error rate and a communication device provided in the embodiments of the present invention. In this specification, specific examples are used for illustrating principles and implementation manners of the present invention. The foregoing description about the embodiments is merely for understanding the methods and core ideas of the present invention. Meanwhile, a person of ordinary skill in the art may make modifications to the specific implementation manners and application scopes according to the idea of the present invention. In conclusion, the content of this specification should not be construed as a limitation to the present invention.

What is claimed is:

1. A method for estimating a block error rate, comprising:
   receiving, by a communication device, N coded code blocks;
   decoding, by the communication device, multiple log-likelihood ratios (LLRs) that correspond to each coded code block among the N coded code blocks to obtain multiple posterior probabilities (APPs) for each coded code block, wherein N is a natural number greater than 1;
   obtaining, by the communication device, a plurality of results, each result of the plurality of results is obtained, according to the multiple APPs, the multiple log-likelihood ratios LLRs, both for each coded code block, and a preset policy, each result of the plurality of results indicating whether the decoding of each coded code block is correct or incorrect, wherein the preset policy comprises: when a ratio of a sum of absolute values of multiple APPs corresponding to a coded code block to a sum of absolute values of multiple LLRs corresponding to the coded code block is greater than or equal to a preset threshold, the decoding for the coded code block is correct; and obtaining, by the communication device, a decoding block error rate according to the plurality of results indicating whether the decoding of the N coded code blocks are correct or incorrect, wherein the number N of coded code blocks are included within a short duration and the decoding block error rate is obtained based on a number of sampling points corresponding to the number N of coded code blocks.

2. The method according to claim 1, wherein the obtaining a decoding block error rate according to the plurality of results indicating whether the decoding of the N coded code blocks are correct or incorrect specifically comprises:

obtaining the decoding block error rate by comparing the number of incorrectly decoded coded blocks with N.

3. A communication device, comprising:
a first decoding unit, configured to decode N received coded code blocks to obtain multiple posterior probabilities (APPs) for each coded code block, wherein N is a natural number greater than 1;
a first decoding result obtaining unit, configured to obtain, a plurality of results, each result of the plurality of results is obtained, according to the multiple APPs for each coded code block by the first decoding unit and a preset policy, each result of the plurality of results indicating whether the decoding of each coded code block is correct or incorrect, wherein the preset policy comprises: when a sum of absolute values of the multiple APPs corresponding to a coded code block is greater than or equal to a preset threshold, the decoding for the coded code block is correct; and
a first block error rate obtaining unit, configured to obtain a decoding block error rate according to the plurality of results indicating whether the decoding of the N coded code blocks are correct or incorrect, wherein the number N of coded code blocks are included within a short duration and the decoding block error rate is obtained based on a number of sampling points corresponding to the number N of coded code blocks.

4. The communication device according to claim 3, wherein the first block error obtaining unit specifically comprises a first ratio obtaining unit, configured to obtain the decoding block error rate by comparing the number of incorrectly decoded coded code blocks with N.

5. A communication device, comprising:
a second decoding unit, configured to decode multiple log-likelihood ratios (LLRs) that correspond to each coded code block among N received coded code blocks to obtain multiple posterior probabilities (APPs) for each coded code block, wherein N is a natural number greater than 1;
a second decoding result obtaining unit, configured to obtain, a plurality of results, each result of the plurality of results is obtained, according to the multiple APPs of the second decoding unit, the multiple log-likelihood ratios (LLRs) both for each coded code block and a preset policy, each result of the plurality of results indicating whether the decoding of each coded code block is correct or incorrect, wherein the preset policy comprises: when a ratio of a sum of absolute values of the multiple APPs corresponding to a coded code block to a sum of absolute values of the multiple LLRs corresponding to the coded code block is greater than or equal to a preset threshold, the decoding for the coded code block is correct; and
a second block error rate obtaining unit, configured to obtain a decoding block error rate according to the plurality of results indicating whether the decoding of the N coded code blocks are correct incorrect, wherein the number N of coded code blocks are included within a short duration and the decoding block error rate is obtained based on a number of sampling points corresponding to the number N of coded code blocks.

6. The communication device according to claim 5, wherein the second block error obtaining unit specifically comprises a second ratio obtaining unit, configured to obtain the decoding block error rate by comparing the number of incorrectly decoded coded code blocks with N.

* * * * *